United States Patent [19]

Ysbrand et al.

[11] 4,158,870

[45] * Jun. 19, 1979

[54] REFLECTING MEANS FOR VISUAL INSPECTION OF MAGNETIC TAPE HEAD

[75] Inventors: Floyd R. Ysbrand; Robert L. Crafts, both of Tulsa, Okla.

[73] Assignee: Telex Computer Products, Inc., Tulsa, Okla.

[*] Notice: The portion of the term of this patent subsequent to Sep. 24, 1991, has been disclaimed.

[21] Appl. No.: 450,332

[22] Filed: Mar. 12, 1974

Related U.S. Application Data

[63] Continuation-in-part of Ser. No. 216,092, Jan. 7, 1972, Pat. No. 3,838,463.

[51] Int. Cl.² .......................... G11B 5/48; G11B 21/24
[52] U.S. Cl. .................................. 360/128; 360/130.21
[58] Field of Search ............... 360/128, 130, 129, 124, 360/137; 350/307, 308; 178/7.89, 7.6, 7.1

[56] References Cited

U.S. PATENT DOCUMENTS

| | | | |
|---|---|---|---|
| 2,283,560 | 5/1942 | Kretchmer | 350/308 |
| 2,678,970 | 5/1954 | Vilkomerson | 360/128 |
| 2,981,805 | 4/1961 | Conly | 360/128 |
| 3,506,271 | 4/1970 | Greifenhagen et al. | 360/130 |
| 3,546,378 | 12/1970 | Karikawa | 178/7.1 |
| 3,688,956 | 9/1972 | Kjos | 360/130 |
| 3,838,463 | 9/1974 | Ysbrand | 360/128 |

*Primary Examiner*—Alfred H. Eddleman
*Attorney, Agent, or Firm*—Head, Johnson & Chafin

[57] ABSTRACT

This invention relates to improvements in magnetic tape transport mechanisms and provides means for facilitating the visual inspection of the magnetic head for use in combination with a flux shield for the magnetic tape. Reflector means is disposed in such a manner that the magnetic head may be easily visually inspected when the flux shield is in a position removed from the vicinity of the magnetic tape.

10 Claims, 3 Drawing Figures

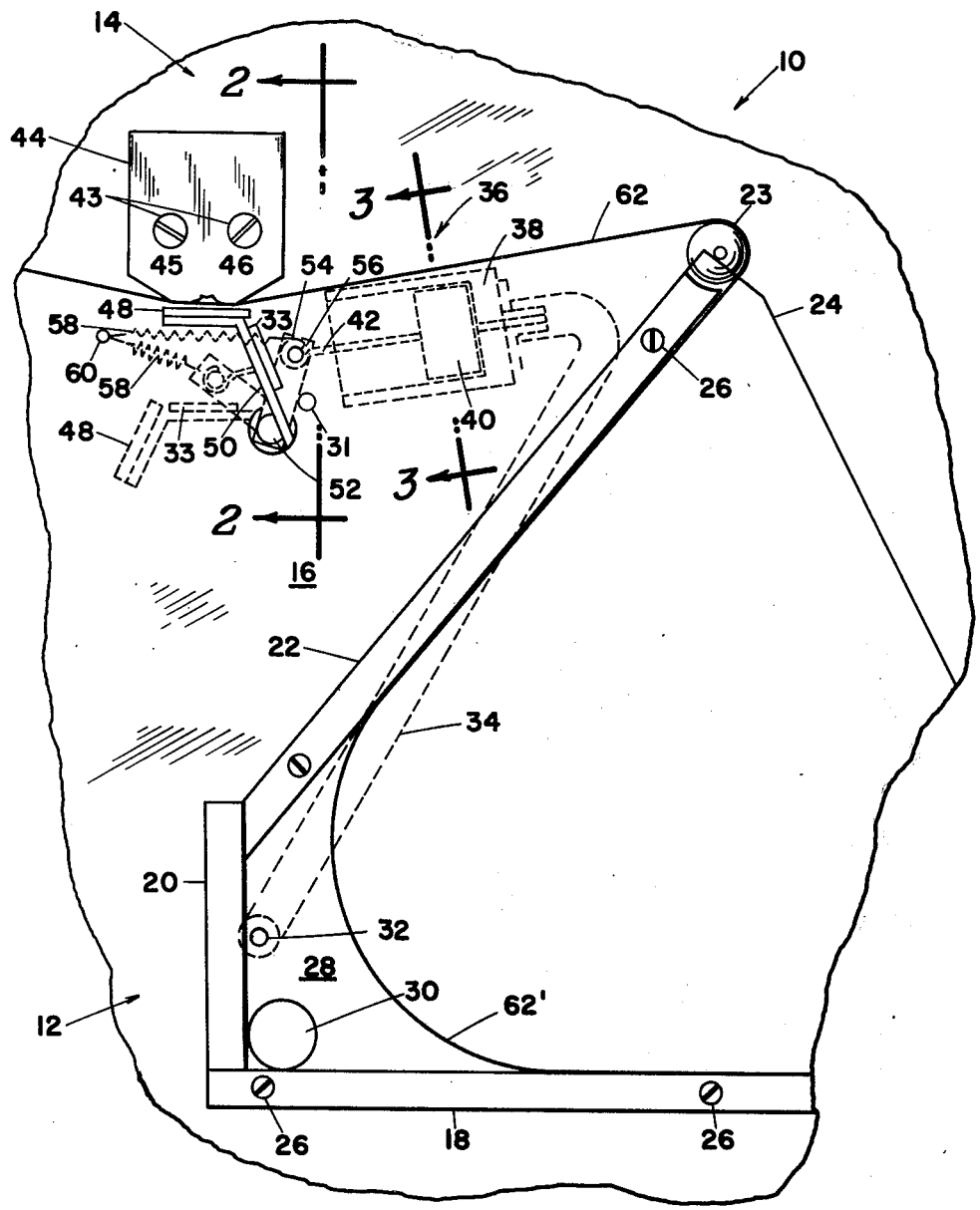
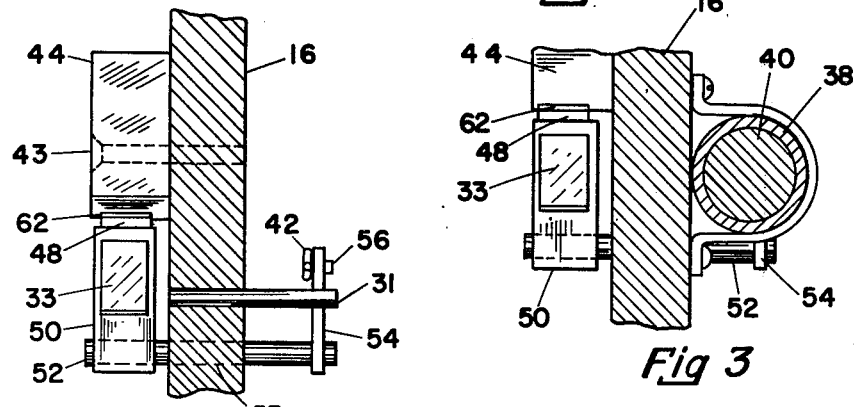
Fig 1
Fig 2
Fig 3

REFLECTING MEANS FOR VISUAL INSPECTION OF MAGNETIC TAPE HEAD

CROSS-REFERENCE TO RELATED APPLICATION

This application is a continuation-in-part of our co-pending application Ser. No. 216,092, filed Jan. 7, 1972, and entitled "Automatic Flux Shield Engagement Mechanism", now U.S. Pat. No. 3,838,463.

BACKGROUND OF THE INVENTION

1. Field of the Invention

This invention is in the field of magnetic tape transport mechanisms, more particularly, it is concerned, in combination with a flux shield, with means for facilitating the visual inspection of a magnetic head when the flux shield is in a position removed from the vicinity of the magnetic tape.

2. Description of the Prior Art

In the prior art, various electromagnetic systems, such as solenoids, air pressure, or other means, and including electronic control circuits have been used to sense the position of a tape in a vacuum column so as to indicate when the tape deck is properly loaded. These systems operate a mechanism to apply a flux shield adjacent to the rearward surface of tape at the magnetic head. However, some delay means must be provided to prevent the flux shield from moving adjacent the head before the tape is in position, that is, so that once the tape is sensed in the vacuum column the flux shield will move smoothly and slowly into operating position. These prior art systems are costly to build and to maintain, and in addition, it is difficult to visually inspect the magnetic head since the magnetic head is normally disposed in an unhandy position with regard to the normal visual access.

SUMMARY OF THE INVENTION

It is an object of this invention to provide a simple, inexpensive and low-maintenance apparatus, in combination with a flux shield, for facilitating the visual inspection of the magnetic head.

These and other objects of this invention and the weaknesses of the prior art systems are overcome in this invention by utilizing a reflecting means, such as a mirror, disposed in such a manner with relation to the magnetic head and flux shield as to permit ready viewing of the magnetic head when the flux shield is in a position removed from the proximity or vicinity of the magnetic head. Whereas the reflecting element may be utilized with substantially any desired flux shield apparatus, the particular apparatus set forth in detail herein is substantially identical with that disclosed in our aforementioned co-pending application, which utilizes the lowered pressure in a vacuum column not only to indicate when the tape is in transportable condition, that is, when the tape deck is loaded with tape, but also to use the vacuum for the operation of an actuator which drives the flux shield into position adjacent the tape opposite the magnetic head.

In operation of this particular apparatus the tape is threaded into a vacuum column from which it is driven past the recording heads. A flux shield is operable so as to move into a first position wherein it almost contacts the back of the tape opposite the magnetic head and to move into a second position away from the magnetic head and the tape. A vacuum actuator is used to move the flux shield from the second to the first position and vice versa. The actuator receives its vacuum control from a vacuum pocket in the vacuum column. Even though vacuum is applied to the vacuum column, if the tape is not threaded through the tape deck, and is not itself in position in the vacuum column, there will not be the desired lowered pressure in the vacuum pocket. Consequently, there is no lowered pressure available to operate the actuator. When the tape is threaded through the tape deck and is looped into the vacuum column, then a pocket is formed of reduced pressure which is communicated to the actuator, which then operates to bring the flux shield into position adjacent the tape and the magnetic head. A reflector member, such as a mirror, is provided for easy visual inspection of the magnetic head when the mechanism is in the second, or non-actuated position.

DESCRIPTION OF THE DRAWINGS

A better understanding of the objects, and the principles of the invention will be evident from the following description, taken in conjunction with the appended drawings in which:

FIG. 1 represents an elevational view of a portion of the tape deck of a magnetic tape transport system in accordance with this invention.

FIG. 2 represents in cross section a portion of FIG. 1 taken along the line 2—2.

FIG. 3 is a cross sectional view taken along line 3—3 of FIG. 1.

DESCRIPTION OF THE PREFERRED EMBODIMENT

Referring now to the drawings, numeral 10 indicates generally a portion of the tape deck of a magnetic tape transport device. The numeral 12 indicates generally a vacuum column and the numeral 14 indicates generally a magnetic head and flux shield system of a type with which the present invention may be utilized in combination.

The vacuum column 12 is conventional in general construction and comprises the walls 16, 18, 20 and 22 with a cylindrical element at the end of the wall 22. This element may be a capstan or a free running roller. The area included between the walls is covered by a transparent plate 24 which may be of glass or plastic. A vacuum opening 30 is provided into the column space through the back wall 16 of the tape deck. When the tape 62 is looped over the element 23 and vacuum applied through 30, the tape is drawn into position 62' by atmospheric pressure on the outside or upper surface of the tape. With the tape 62' in the operating position, the vacuum communicated to the pocket 28 through the opening 30 is comparable to that supplied by the vacuum reservoir.

The vacuum in the pocket 28 is communicated through a small opening 32 in the back plate 16 and through conduit, pipe or hose 34 to a vacuum actuator 36 which is mounted behind the back plate. The actuator, as illustrated, comprises a cylinder 38 and a freely moving piston 40 with an actuator rod 42.

The magnetic head system 14 includes a magnetic head structure 44 which is attached to the back plate 16 by means such as screws 43. Indicated are two transducing areas 45 and 46 engaged by tape 62 due to the normal tension in the tape.

In a typical tape transport system the magnetic head 44 is a read-write head. To prevent stray magnetic fields from effecting the integrity of data contained on the tape a magnetic shield is preferably positioned adjacent the tape 62 opposite magnetic head 14. The magnetic shield preferably does not touch the tape 62 to avoid imposing unnecessary drag or wear on the tape, but it should be as close to the tape as possible. Obviously, a flux shield could be permanently extended from back wall 16 but such would make it difficult to thread the tape 62. The particular mechanism illustrated herein provides a means for automatically moving a flux shield into position when tape is being moved past the magnetic head for read or write purposes, and for automatically moving the flux shield otherwise out away from the magnetic head to permit easy threading of the tape onto the transport.

A flux shield 48 is mounted on an arm 50 which is attached to a rod or shaft 52 which passes through a bearing 53 in the back wall 16. An arm 54 is attached to the shaft 52 and the actuator rod 42 is attached to a pin 56 in the arm 54. The arrangement is such that when the piston 40 is pulled to the right, toward the base of the cylinder 38 by the vacuum communicated from the pocket 28, the actuator rod 42 pulls the arm 54 and rotates the flux shield 48 up into a first position adjacent the back of the tape. When vacuum is turned off through opening 30, this equalizes the pressure on both sides of the piston 40 and the arm 50 returns by its own weight to second position shown in dotted outline away from the tape. If desired, a spring 58 attached to arm 54 can be used to pull the flux shield to its second position. When vacuum is again applied at opening 32 the piston will again be pulled to the right, lifting the flux shield into first position adjacent the tape.

Flux shields have been used to control cross talk between transducing areas, and there is considerable art on the type of material, etc. that is most suitable for this purpose. Any of such materials may be used in this application. While a rotating system has been shown to withdraw and to position the flux shield into position adjacent the tape, other mechanical systems could equally well be used to provide this contact. For example, the flux shield could be rotated into position about a horizontal axis parallel to the back plate instead of perpendicular to the back plate as shown. Also a type of operation in which the flux shield is traversed perpendicular to its plane could also be used.

While the actuator is shown as a piston and cylinder, other means of exerting a force on the application of vacuum could equally well be applied. The important feature of the particular mechanism depicted herein lies in the use of the vacuum in the vacuum pocket of the vacuum column both as the motive power for the operation of the flux shield engagement mechanism and also for sensing the position of the tape, so as to ensure that the flux shield does not get into its operating position until the tape has been threaded through the heads and the vacuum columns and is in condition to be traversed over the heads. Therefore, the simple expedient of using this vacuum as a control and operating medium simplifies the design, construction and maintenance of the flux shield system.

To ensure proper positioning of the flux shield 48 adjacent tape 62 without contacting the tape, a stop pin 1 extends from back wall 16. Arm 54 engages stop pin 1 when piston 40 is withdrawn. Adjustable means may be provided with stop pin 31 if desired, such as an eccentric sleeve about the stop pin, to permit adjustment of the spacing between the flux shield 48 and tape 62 when the mechanism is in the actuated position.

The important feature of this invention is the provision of means of visually inspecting the transducing areas 45 and 46 of the magnetic head. Affixed to the arm 50 is a mirror 33. When the mechanism is in the non-actuated position, as shown in dotted outline in FIG. 1, the mirror 33 is spaced from, and parallel to the transducing areas 45 and 46 of the magnetic head 44. By looking downwardly into the mirror the transducing areas 45 and 46 are seen as reflections from the mirror and inspection can be made to determine the condition of the magnetic head recording areas.

Of course, it is to be understood that the mirror 33, or other suitable reflecting element, may be suitably mounted in combination with substantially any flux shield mechanism in order to reflect the magnetic head recording areas for facilitating the inspection thereof, and there is no intention of limiting the invention to the particular flux shield mechanism depicted herein.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to which each element or step thereof is entitled.

What is claimed:

1. In a magnetic tape transport system including a magnetic head, a magnetic tape, and means to drive and guide said tape past said head, the improvement comprising:
    (a) reflecting means spaced from said magnetic head for reflecting the image thereof to facilitate a visual inspection of the condition of the magnetic head;
    (b) flux shield means operable between a first position in which it is adjacent said tape opposite said magnetic head, and a second position in which it is away from said tape, said reflecting means providing a reflected image of said magnetic head when the flux shield is in said second position;
    (c) at least one vacuum column, said drive means operable for driving the magnetic tape from said vacuum column past said head; and
    (d) vacuum actuator means cooperating with said flux shield means for positioning thereof in said first and second positions.

2. The magnetic tape transport system as in claim 1 wherein the reflecting means comprises a mirror.

3. The magnetic tape transport system as in claim 1 wherein the reflecting means is affixed to the flux shield means.

4. The magnetic tape transport system as in claim 1 in which said flux shield is a planar sheet of magnetic material.

5. The magnetic tape transport system as in claim 1 in which said actuator means comprises dashpot cylinder means.

6. The magnetic tape transport system as in claim 1 in which said reflecting means is attached to said flux shield means.

7. The magnetic tape transport as in claim 1 in which said flux shield means is rotatable about an axis perpendicular to the back plate supporting said head means.

8. The magnetic tape transport as in claim 7 including spring return means to insure return of said flux shield means to its second position when vacuum is removed from said actuator.

9. In a magnetic tape transport system including a magnetic head, at least one vacuum column, a magnetic tape, and means to drive and guide said tape from said vacuum column past said head, the improvement comprising:
 (a) flux shield means operable between a first position in which it is adjacent said tape opposite said magnetic head, and a second position in which it is away from said tape;
 (b) vacuum actuator means for positioning said flux shield means, said actuator including means responsive to the application of vacuum to move said flux shield to its first position, and responsive to the removal of vacuum to move said flux shield to its second position;
 (c) vacuum conduit means connecting said actuator to the vacuum pocket of said vacuum column; and
 (d) a mirror affixed to said flux shield means, positioned, when said flux shield means is in said second position, spaced from said magnetic head to permit visual inspection of said magnetic head by the image thereof reflected by said mirror.

10. The magnetic tape transport system as in claim 9 in which said flux shield is a planar sheet of magnetic material.

* * * * *